United States Patent
Dai et al.

(10) Patent No.: US 8,381,300 B2
(45) Date of Patent: Feb. 19, 2013

(54) OFFLINE EXTRACTION OF CONFIGURATION DATA

(75) Inventors: Hui Dai, Redmond, WA (US); Anil F. Thomas, Redmond, WA (US); Catalin D. Sandu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1061 days.

(21) Appl. No.: 12/359,347

(22) Filed: Jan. 26, 2009

(65) Prior Publication Data
US 2010/0192227 A1    Jul. 29, 2010

(51) Int. Cl.
*H04L 29/06* (2006.01)
(52) U.S. Cl. ............................ 726/24; 726/23
(58) Field of Classification Search ............ 726/23, 726/24
See application file for complete search history.

(56) References Cited

U.S. PATENT DOCUMENTS

| | | | |
|---|---|---|---|
| 5,628,005 A * | 5/1997 | Hurvig | 710/200 |
| 6,529,965 B1 | 3/2003 | Thomsen et al. | |
| 7,062,764 B2 | 6/2006 | Cohen et al. | |
| 7,203,696 B2 | 4/2007 | Atm | |
| 2005/0033777 A1 | 2/2005 | Moraes et al. | |
| 2006/0130141 A1 * | 6/2006 | Kramer et al. | 726/23 |
| 2006/0259964 A1 | 11/2006 | Maldonado et al. | |
| 2010/0114919 A1 * | 5/2010 | Sandhu | 707/755 |

OTHER PUBLICATIONS

"Windows Incident Response", retrieved at <<http://windowsir.blogspot.com/>>, Oct. 7, 2008, pp. 7.
Rhyous, "Working with Registry Keys in a Batch File", retrieved at <<http://community.landesk.com/support/docs/DOC-2417;jsessionid=03948198B3CFA8203EFDD4F224A17427>>, Version 3 Published, Jan. 28, 2008, pp. 6.
"Windows Incident Response", retrieved at <<http://windowsir.blogspot.com/2006_10_01_archive.html>>, Oct. 30, 2006, pp. 15.
"Registry Watch", retrieved at <<http://www.sharewareconnection.com/registry-watch.htm>>, Oct. 10, 2008, pp. 3.
Russinovich, Mark, "Inside the Registry", retrieved at <<http://technet.microsoft.com/en-us/library/cc750583.aspx>>, Oct. 10, 2008, pp. 8.

* cited by examiner

*Primary Examiner* — Jeffrey Pwu
*Assistant Examiner* — Thong Truong
(74) *Attorney, Agent, or Firm* — Chin IP, PLLC; David Chin

(57) ABSTRACT

A configuration scanning system is described herein that scans a system configuration database for malware-related information with less impact on other operations that access the system configuration database. The system employs techniques to reduce the impact on other operations that access the configuration database, including parsing a file-based stored version of the configuration database, accessing the configuration database using opportunistic locking, and caching configuration information obtained by scanning the configuration database. In this way, the system is able to respond to requests antimalware programs using cached information without impacting other programs using the configuration database. Thus, the configuration scanning system protects a computer system against malware while reducing the burden on the configuration database and on other programs that access the configuration database.

20 Claims, 3 Drawing Sheets

OFFLINE EXTRACTION OF CONFIGURATION DATA

BACKGROUND

Antivirus, antispyware, and other anti-malware applications seek to protect client computers by identifying harmful applications or other executable code and removing or at least neutralizing the harmful code. One of the techniques used by anti-malware applications (e.g., Microsoft Windows Defender, Microsoft Forefront Client Security, Microsoft OneCare, Microsoft Forefront Server for Exchange Server, and so forth) is a signature-based approach to detect viruses, worms, and spyware. A threat to the anti-malware product is a group of objects detected on the target system related to an instance of malware. Each object in the group is a resource, such as a file, registry key, or other system object.

Malware information and information related to detecting malware is often stored in one or more configuration databases, such as the Microsoft Windows Registry. The malware product may use the configuration information to locate malware by determining where a user's documents folder is located, where a user's applications download files, and so forth. Malware information may also be stored along with configuration information, such as in registry keys that specify applications to run when a user logs on. Thus, scanning one or multiple system or user configuration databases is often a preliminary step performed by anti-malware applications to detect changes and harmful modifications, as well as to query configuration information used to scan other parts of the system. As an example, malware may be located at the logical path C:\spy.exe on an inactive system. However, from the running system, the logical path to access this file may be D:\spy.exe due to the operating system's internal partition mapping technique. To properly find the malware, an anti-malware program loads the operating system's configuration database to identify partition mappings The system configuration database is often stored in several physical files separately on a computer storage system or networked server. Not all registry files are loaded into the system when the system is running. For example, in a multiuser system, the operating system may not load configuration files associated with a logged off user. When a computer system is offline, registry files on the system may be in an unloaded state. To access a logged-off user's or inactive system's configuration files, an anti-malware product may load the configuration files from the computer storage system. As an example, malware may be stored in the registry key "HKU\S-1-5-21-2127521184-1604012920-1887927527-2468930\Software\Microsoft\Windows\Run" on a computer system. When the infected user is not logged on, this registry key is not loaded into memory and thus the antimalware program cannot scan the registry key without loading the key into memory (and thereby consuming additional system resources).

This practice has several drawbacks. First, it is expensive in terms of memory usage, processor time, and input/output (I/O) operations to load a large system configuration file. In addition, the system configuration files are a public resource shared by multiple application and system activities, and the system may expect exclusive access to the configuration files. Loading a logged-off user's configuration file could potentially conflict with these other activities (e.g., a profile service attempting to log a user on to the system). Such conflicts can potentially result in an unstable system that prevents the user from logging on to the system. Even when loaded to memory, a user's configuration files may be difficult to scan because malware often uses operating system functions to hide registry keys that contain malware data. In addition, configuration files loaded in memory may be larger than their disk-based counterparts due to pointers and other data members set up in memory for faster memory access.

SUMMARY

A configuration scanning system is described herein that scans a system configuration database for malware-related information with less impact on other operations that access the system configuration database. The configuration scanning system employs several techniques to reduce the impact on other programs that access the configuration database, including: parsing a file-based stored version of the configuration database rather than scanning a version of the database loaded in memory, accessing the configuration database using opportunistic locking that allows the system to be notified when another program wants to access the file, and caching configuration information obtained by scanning the configuration database In this way, the system is able to respond to requests from an antimalware program using the cached information and without impacting other programs using the configuration database. Thus, the configuration scanning system protects a computer system against malware while reducing the burden on the configuration database and on other programs that access the configuration database.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A configuration scanning system is described herein that scans a system configuration database for malware-related information with less impact on other operations that access the system configuration database. The configuration scanning system employs several techniques to reduce the impact on other operations. In some embodiments, the system accesses the configuration database by scanning a file-based stored version of the database rather than scanning a version of the database loaded in memory. Scanning the file-based version results in faster scanning time, because the file-based version may be more compact or may involve less overhead than an in-memory version. Scanning the file-based version may also result in a more complete scan, because it is more difficult for malware to hide configuration data related to the malware in the file-based version of the database.

In some embodiments, the system accesses the configuration database using opportunistic locking, such as that provided by Microsoft Windows. Opportunistic locks allow one program to use a file according to one access scheme (e.g., reading, or reading and writing), and to be notified when another program wants to access the file according to a conflicting access scheme. Instead of the operating system denying the second program's request, the operating system notifies the first program, provides the opportunity for the first program to release the file, and then responds to the second program's request. If the configuration scanning system is accessing the file and a competing request is received, the system can release the file so that other programs (e.g., a profile service) can use the file.

In some embodiments, the configuration scanning system caches configuration information obtained by scanning the configuration database, and monitors the original configuration database for changes. In this way, the system is able to respond to requests from an antimalware program using the cached information without impacting other programs using the configuration database. By monitoring the configuration database, the system can detect changes that may make the cache stale and can update the cache with the changed information. Thus, the configuration scanning system protects a computer system against malware while reducing the burden on the configuration database and on other programs that access the configuration database.

Figure 1:
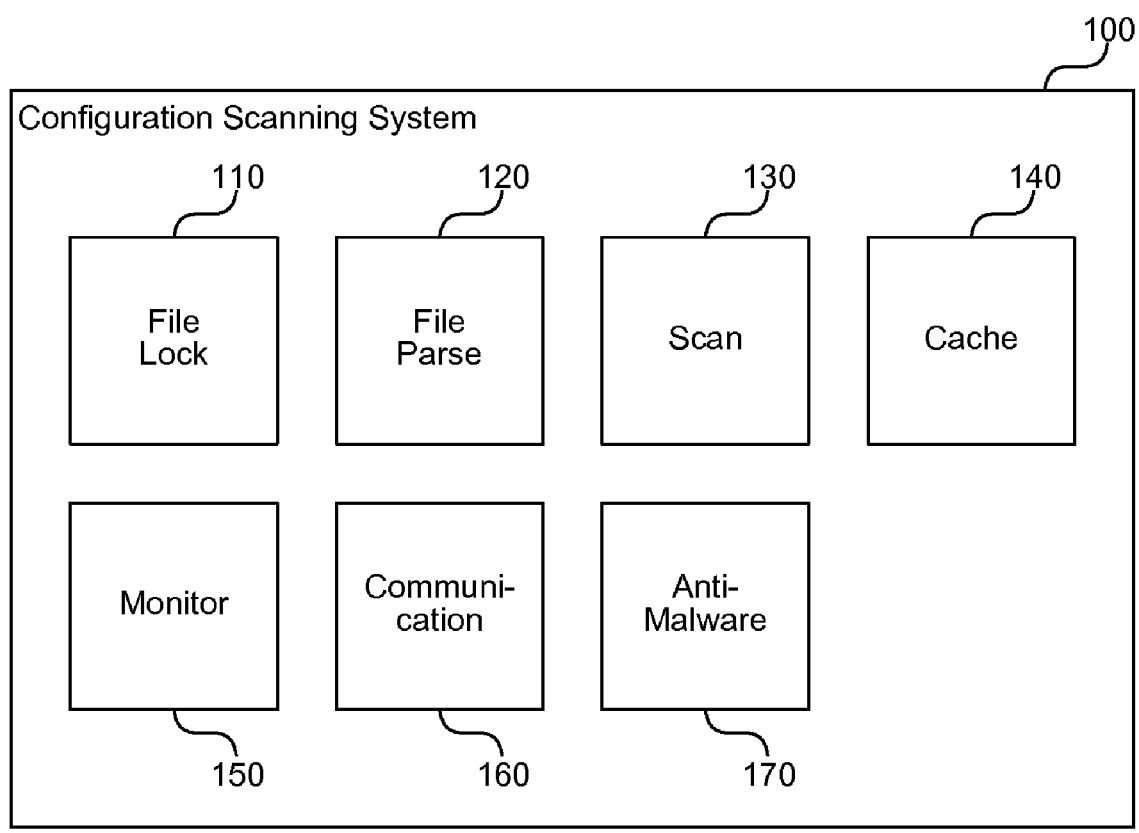
FIG. 1 is a block diagram that illustrates components of the configuration scanning system, in one embodiment.

FIG. 1 is a block diagram that illustrates components of the configuration scanning system, in one embodiment. The configuration scanning system 100 includes a file lock component 110, a file parse component 120, a scan component 130, a cache component 140, a monitor component 150, a communication component 160, and an antimalware component 170. Each of these components is described in further detail herein.

The file lock component 110 requests an opportunistic lock when the system 100 accesses a configuration database file and handles lock notifications when another application requests conflicting access to the file. For example, the file lock component 110 may request an opportunistic read lock from the operating system when accessing a configuration database file. If another application attempts to open the file with write access, then the operating system provides a notification to the file lock component 110 indicating that the other application may modify the file. The file lock component can then stop any pending file operations and release access to the file so that the operating system allows the other application's request.

The file parse component 120 parses a configuration database file locked by the file lock component 110 to identify configuration data stored in the files. The file parse component 120 may include knowledge about one or more file formats that describe the layout of data in configuration database files. For example, a configuration database file may contain one or more flattened data structures stored sequentially or according to a particular scheme within the file. The file parse component 120 allows the rest of the system 100 to request data based on a common identification of the data (e.g., a registry path or key name) without understanding the format of the requested data on disk or other storage device.

The scan component 130 uses the file parse component 120 to scan a hierarchy of data stored in a configuration database file. Configuration database files may contain many hierarchies that organize data by users, application, system device, and so forth. The scan component enumerates each path in the configuration file, or at least paths that are relevant to antimalware programs to identify configuration data that may contain malware or that may contain information for scanning additional resources for malware (e.g., a user's documents directory on disk).

The cache component 140 caches configuration data enumerated by the scan component 130 for later retrieval by antimalware or other programs. The cache component 140 provides a way to access configuration data without accessing the configuration database for each request, and thus reduces the overlap of antimalware requests to the configuration database with access by other programs to the configuration database. The cache component 140 may also store information for determining the freshness of the cached data, such as a timestamp of the last scan of the configuration database, checksum of the data in the cache (or in individual keys), and so forth.

The monitor component 150 monitors the configuration database for changes so that the scan component 130 can update the cache component 140 with new or changed configuration data. The monitor component 150 may use operating system APIs (e.g., the Microsoft Windows API RegNotifyChangeKeyValue) to determine when an in-memory copy of the configuration database changes. The monitor component 150 may wait until other programs have stopped accessing the configuration database to initiate a scan of the file-based version of the configuration database, or may obtain the changes directly from the in-memory copy of the configuration database. The monitor component 150 may also mark the cache as old to inform the antimalware component 170 that it needs to request a cache update before using the cache.

The communication component 160 allows the system 100 to operate over a network, so that one computer can scan the configuration database of another computer. The communication component 160 may incorporate operating system components, such as a networking stack, remote registry API, remote opportunistic locking, and so forth, to provide similar features to those available when scanning a computer locally.

The antimalware component 170 accesses the cache component 140 or receives information directly from the scan component 130 to identify configuration data that may contain malware or that contains information to look further for malware. For example, the operating system often uses configuration data to store a location on disk or other storage of a user's documents directory, a map for accessing partitions of a storage device, an encryption key for encrypted files, and other information. The antimalware component 170 may access the configuration database through the cached data before performing other scans, such as scanning a computer's hard drive for stored malware-related files.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, smart phones, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
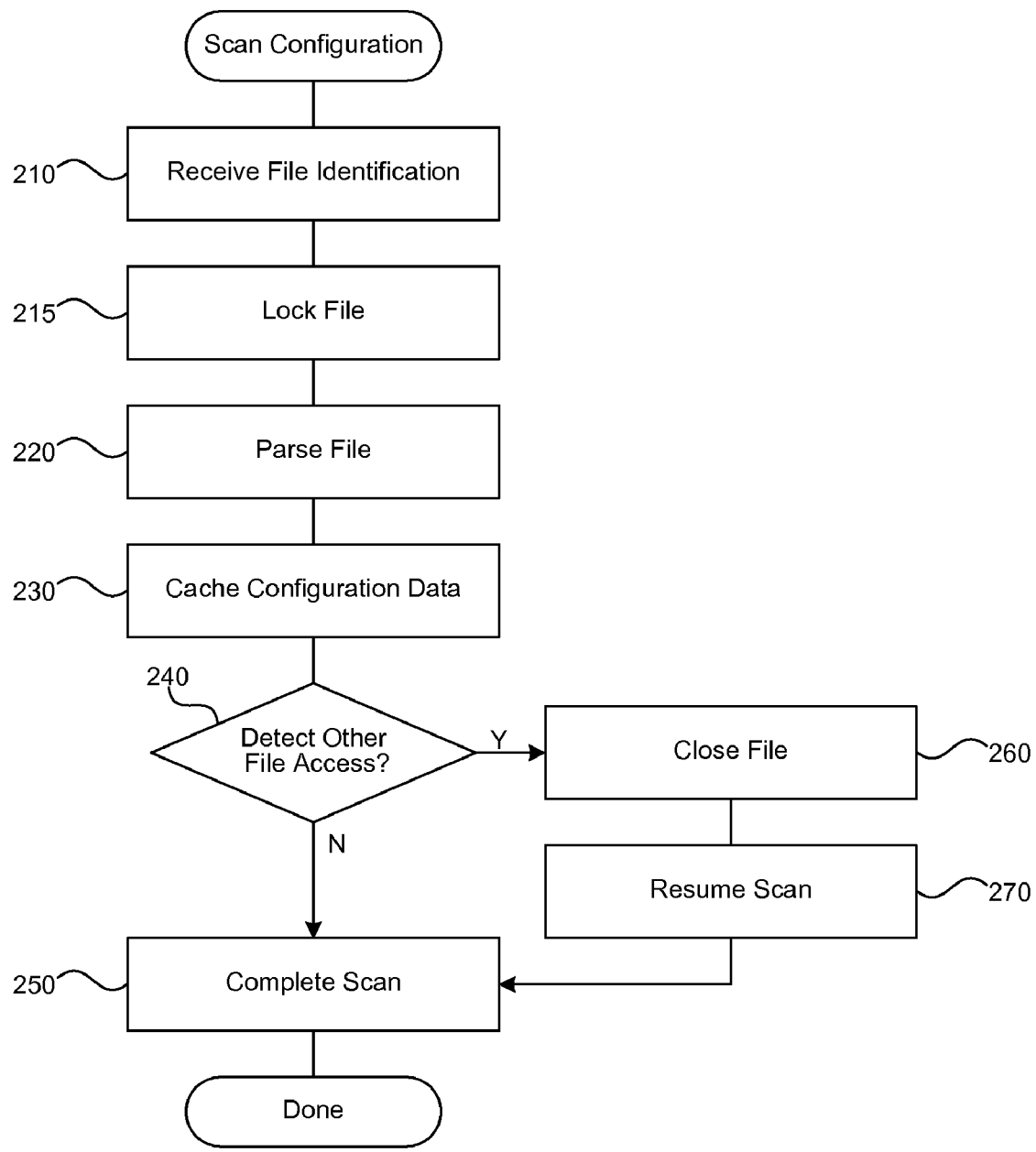
FIG. 2 is a flow diagram that illustrates the processing of the configuration scanning system to scan the configuration database of a computer, in one embodiment.

FIG. 2 is a flow diagram that illustrates the processing of the configuration scanning system to scan the configuration database of a computer, in one embodiment. In block 210, the system receives information identifying the location of a configuration database file. For example, an operating system may store the configuration database file at a common location on each computer so that the configuration scanning system can access it directly, or a scan of the computer's storage devices may have identified a configuration database file. Continuing in block 215, the system locks the file for read access. For example, the system may request from the operating system an opportunistic lock for reading the file.

Continuing in block 220, the system parses the configuration database file to extract configuration data from the file. For example, given a registry file location, the system can parse the registry file using an interface provided by the operating system. Continuing in block 230, the system stores extracted configuration data in a cache for later usage, such as by an antimalware product. The system may cache related system and user information together to help identify the context and the resource path of the configuration data.

Continuing in decision block 240, if the system detects access to the configuration database file by another program while the system is reading information from the file, then the system continues in block 260, else the system continues in block 250. The configuration scanning system can monitor whether the operating system or other programs are trying to load the configuration database file with techniques such as opportunistic locking or a monitoring driver. For example, if a user logs in, then the system may receive a notification that the profile service is attempting to load configuration data related to the user.

Continuing in block 260, if the system detects that another program is trying to access the configuration database file, then the system terminates parsing the file so that the other program can access the file. Alternatively or additionally, the system may complete the scan and then return, since the operating system waits for the owner of the lock for a reasonable amount of time. If the scan is quick, it may be better to complete the scan before returning control. Continuing in block 270, the system may later resume the scan of the configuration database file if the system detects that the other program's access to the file is complete. For example, if the user logs off, the operating system may unload configuration data related to the user from memory. Continuing in block 250, the system completes the scan of the configuration database file. If the system has not read all of the relevant information from the file, then the system may continue scanning later or loop to block 220 to parse additional information from the file. After block 250, these steps conclude.

Figure 3:
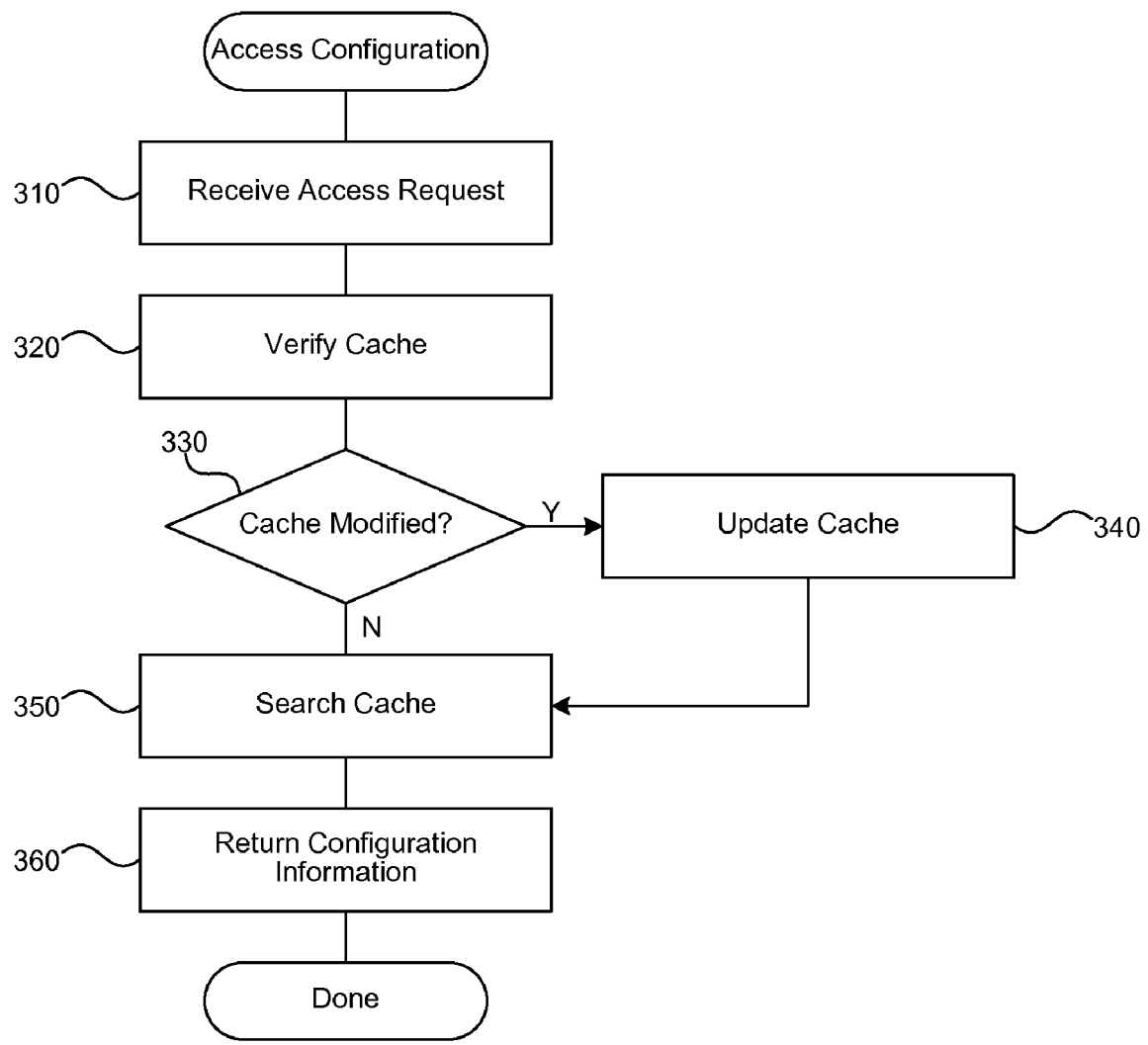
FIG. 3 is a flow diagram that illustrates the processing of the system to access configuration data, in one embodiment.

FIG. 3 is a flow diagram that illustrates the processing of the system to access configuration data, in one embodiment. For example, the system may use these steps to access configuration data cached by the process described with reference to FIG. 2. In block 310, the system receives a request to access configuration data related to a computer. For example, the system may receive the request from an antimalware product performing a daily scan of the computer. Continuing in block 320, the system validates any configuration data cached by the system to determine whether the cached information is stale. For example, the system may determine whether the configuration data has been modified since the last scan of the configuration database. The system can detect such modifications, for example, by checking the last modification time, calculating the checksum of the registry file, checking the system log, or registering for file modification notifications with operating system hooking APIs or drivers.

Continuing in decision block 330, if the system determines that the cache is not up to date, then the system continues in block 340, else the system continues in block 350. Continuing in block 340, the system updates the cache by accessing the latest configuration data from the configuration database. In some embodiments, the system may determine that although the cached information is out of date, it is nevertheless up to date enough to service the received request. In such cases, the system may reply with cached data without updating the cache or search directly in the configuration database while updating the cache at the same time (and skipping block 350). Continuing in block 350, if the cached data has not been modified or if the system updated the cache, then the system searches the cache storage to find the requested resource information. When searching for the requested resource in the cached storage, the system uses a resource logical path or other resource identifier to compare against the entries in the cached records. If the key of a record entry matches the requested resource, the system retrieves the value of the record entry (which may include a logical path used to access the resource when the user is logged on).

Continuing in block 360, the system returns the identified configuration information in response to the request. If the configuration information was found in the cache, then the system is able to respond without accessing the configuration database at the time of the request and thus without interfering with other programs' access to the configuration database. Even when the system does access the configuration database (e.g., when the cache is stale), the system's access is reduced by accessing only information that is new or has changed since the system last refreshed the cache. After block 360, these steps conclude.

In some embodiments, the configuration scanning system accesses an operating system provided application-programming interface (API) to access the file-based version of the configuration database. Accessing operating system files directly is often difficult because file organization may change from version to version of the operating system, and the system may not know all of the nuances associated with the operating system's use of the file. Thus, the operating system may provide an API through which applications can more safely access this data. Using this API ensures that programs will continue to work as the operating system is updated, because the operating system manufacturer will update the API to work with any changes to operating system file formats.

In some embodiments, the configuration scanning system scans a first computer for malware from a second computer over a network or other connection (e.g., a USB-to-USB connection or mobile device to PC connection). For example, an administrator in an organization may use one computer system to scan each of the other computer systems attached to the organization's network each night. By accessing the file-based version of the first computer's configuration database, the system does not need the configuration database to be active or loaded into memory on the first system. In addition, techniques described herein, such as opportunistic locking, work across the network as well as on a local system. Accordingly, if the second computer is accessing the first computer's configuration database when the first computer becomes active (e.g., by a user logging on to the first computer), then the configuration scanning system can receive a notification on the second computer and can relinquish access to the configuration database so that the first computer can operate normally. In such cases, the system may store the progress of any scan so that the system can resume the scan later.

In some embodiments, the configuration scanning system is implemented as a separate component invoked by an antimalware product. The antimalware product provides the location of the configuration database to the system and the system performs the scanning described herein. The antimalware product can invoke the system to access specific locations in the configuration database, and the system can respond from the cache or by accessing the configuration database file directly.

In some embodiments, the configuration scanning system uses a monitor driver instead of opportunistic locking to detect competing access to the configuration database, such as by other programs. For example, the system may install a kernel-mode file system filter driver that the operating system calls when a program attempts to access the configuration database file. The configuration scanning system can then terminate any access the system is making to the file so that the other program can use the file, unaware of the configuration scanning system's use of the file. Alternatively or additionally, the system can use a publisher/subscriber model to receive notification of changes from the operating system.

In some embodiments, the configuration scanning system provides automated remediation of malware found during scanning. For example, while caching data, the system may identify known malware based on particular registry keys or values and remove or neutralize the malware during the scan. The system may also provide an audit trail or log of any malware found for later remediation by another component. For example, auto-remediation can include locking down firewall configuration, installing security patches, installing antivirus signature updates, removing a registry key, deleting files, and enabling other security features automatically.

From the foregoing, it will be appreciated that specific embodiments of the system have been described herein for purposes of illustration, but that various modifications may be made without deviating from the spirit and scope of the invention. For example, although configuration database files have been described herein, the system can also be used to scan other types of files that may have multiple programs competing for access, such as a virtual machine virtual hard drive (VHD) file, databases, a search index, and so forth. Accordingly, the invention is not limited except as by the appended claims.

We claim:

1. A computer-implemented method for accessing system configuration data for a computing device by a first application, the method comprising:
    receiving, by the computing device, information identifying the location of a system configuration file, wherein the system configuration file has at least a portion of a database of the system configuration data for the computing device stored therein;
    locking at least read access to the system configuration file via an opportunistic lock;
    extracting system configuration data from the system configuration;
    storing, by the computing device, the extracted system configuration data in a cache;
    receiving a notification of an attempt by another application to access the system configuration file; and
    in response to the received notification, terminating access to the system configuration file.

2. The method of claim 1 wherein locking the system configuration file comprises also locking write access to the system configuration file and wherein the method further comprises:
    identifying a malware application via an analysis of the cached configuration data; and
    automatically remediating the malware application, including:
        writing a change to the system configuration file.

3. The method of claim 1 wherein the first application is an antimalware application executing on the computing device, and wherein the method further comprises:
    accessing, by the antimalware application, the cached system configuration data without additionally accessing the system configuration file.

4. The method of claim 1 wherein the notification is received in response to a loading of the system configuration file initiated by a logon of a user onto the computing device, and wherein the system configuration file includes at least a portion of a user profile for the user.

5. The method of claim 1, wherein the method further comprises:
    receiving an indication that the other application has completed accessing the system configured file; and
    in response to the received indication, resuming access to the configuration file.

6. The method of claim 1 wherein the method further comprises:
    following a completion of the storing of the system configuration data in the cache, indicating that the cached system configuration data is based on a current version of the system configuration file.

7. The method of claim 1 wherein the method further comprises:
    detecting a change to the system configuration file; and
    in response to detection of the change, updating the cached system configuration data.

8. The method of claim 1 wherein the method further comprises:
    determining a configuration of the computing device based on the cached system configuration data; and
    scanning the computing device for malware based on the determined configuration of the computing device.

9. The method of claim 1 wherein the method further comprises:
    analyzing the cached system configuration data for indications of malware on the computing device.

10. The method of claim 1 wherein the system configuration file is a registry data file.

11. The method of claim 1 wherein the system configuration file includes registry data that is not loaded into a current operating profile of the computing device.

12. A computer-readable storage medium, not consisting a signal per se, that stores instructions for controlling operations of a computing device, wherein the instructions enable the computing device to perform actions comprising:
    receiving information identifying the location of a system configuration file, wherein the system configuration file has at least a portion of a database of system configuration data for the computing device stored therein, wherein the system configuration data is separate from a current operating profile of the computing device;
    locking at least read access to the system configuration file;
    extracting configuration data from the system configuration file;

storing the extracted system configuration data in a cache;

receiving a notification of an attempt by another application to access the system configuration file; and in response to the received notification, suspending access to the system configuration file.

13. The computer-readable storage medium of claim 12 wherein the notification is received in response to a loading of the system configuration file initiated by a logon of a user onto the computing device, and wherein the system configuration file includes at least a portion of a user profile for the user.

14. The computer-readable storage medium of claim 12 wherein the actions further comprise:

determining a configuration of the computing device based on the cached system configuration data; and scanning the computing device for malware based on the determined configuration of the computing device.

15. The computer-readable storage medium of claim 12 wherein the actions further comprise:

analyzing the cached system configuration data for indications of malware on the computing device.

16. The computer-readable storage medium of claim 12 wherein the system configuration file is a registry data file.

17. A computing device, comprising:

a memory and a processor that are respectively configured to store and execute instructions, including instructions that are organized into:

a file lock component configured to:

lock at least read access to an identified system configuration file via an opportunistic lock, wherein the system configuration file has at least a portion of a database of system configuration data for the computing device stored therein, receive a notification of an attempt by another application to access the system configuration file, and to terminate access to the system configuration file in response to the received notification;

a file parse component configured to extract system configuration data from the system configuration file; and a cache component configured to store the extracted configuration data in a cache.

18. The device of claim 17 wherein the file lock component is further configured to receive the notification in response to a loading of the system configuration file during a user logon process executing on the computing device, and wherein the system configuration file includes at least a portion of a user profile for the user.

19. The device of claim 17 wherein the instructions are further organized into a monitor component that is configured to:

detect a change to the system configuration file; and in response to detection of the change, update the system configuration data in the cache.

20. The device of claim 17 wherein the instructions are further organized into an antimalware component that is configured to:

determining a configuration of the computing device based on the cached system configuration data; and scanning the computing device for malware based on the determined configuration of the computing device.

\* \* \* \* \*